United States Patent
Inoue et al.

(10) Patent No.: US 6,170,057 B1
(45) Date of Patent: Jan. 2, 2001

(54) MOBILE COMPUTER AND METHOD OF PACKET ENCRYPTION AND AUTHENTICATION IN MOBILE COMPUTING BASED ON SECURITY POLICY OF VISITED NETWORK

(75) Inventors: Atsushi Inoue; Masahiro Ishiyama; Atsushi Fukumoto; Yoshiyuki Tsuda; Atsushi Shimbo; Toshio Okamoto, all of Tokyo (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 08/951,297

(22) Filed: Oct. 16, 1997

(30) Foreign Application Priority Data

Oct. 16, 1996 (JP) .................................................. 8-273557

(51) Int. Cl.$^7$ ....................................................... H04L 9/00
(52) U.S. Cl. ............................ 713/153; 380/23; 380/25; 380/49; 713/154; 713/160; 713/161; 705/65; 705/67; 705/73
(58) Field of Search ................................ 380/23, 25, 49, 380/287, 255, 270; 713/153, 154, 160, 161; 705/65, 67, 73

(56) References Cited

U.S. PATENT DOCUMENTS

| | | | |
|---|---|---|---|
| 5,303,303 | * | 4/1994 | White ................................... 380/49 |
| 5,444,782 | * | 8/1995 | Adams, Jr. et al. ................. 380/49 |
| 5,559,883 | * | 9/1996 | Williams .............................. 380/4 |
| 5,812,671 | * | 9/1998 | Ross, Jr. .............................. 380/49 |
| 5,850,449 | * | 12/1998 | McManis ............................. 380/25 |
| 5,870,479 | * | 2/1999 | Feiken et al. ....................... 380/49 |
| 5,884,025 | * | 3/1999 | Bachr et al. ................... 395/187.01 |
| 5,898,784 | * | 4/1999 | Kirby et al. ......................... 380/49 |

OTHER PUBLICATIONS

R. Atkinson "Security Architecture for the Internet Protocol" *Naval Research Laboratory* pp. 1–22 (1995).
R. Atkinson "IP Authentication Header" *Naval Research Laboratory* pp. 1–13 (1995).
R. Atkinson "IP Encapsulating Security Payload (ESP)" *Naval Research Laboratory* pp. 1–12 (1995).
P. Metzger et al. "IP Authentication using Keyed MD5" *Daydreamer* pp. 1–5 (1995).
P. Karn et al. "The ESP DES–CBC Tranform" *Daydreamer* pp. 1–9 (1995).
C. Perkins "IP Mobility Support" *IBM* pp. 1–79 (1996).

* cited by examiner

Primary Examiner—Tod R. Swann
Assistant Examiner—Paul E. Callahan
(74) Attorney, Agent, or Firm—Foley & Lardner (57) ABSTRACT

A mobile computer and a packet encryption and authentication method which are capable of controlling an activation of a packet encryption and authentication device belonging to the mobile computer according to the security policy at the visited network of the mobile computer. The mobile computer is provided with a packet encryption and authentication unit having an ON/OFF switchable function for applying an encryption and authentication processing on input/output packets of the mobile computer. Then, one of the packet encryption and authentication unit and an external packet processing device is selectively controlled to carry out the encryption and authentication processing on the input/output packets, where the external packet processing device being provided in a visited network at which the mobile computer is located and having a function for relaying packets transferred between a computer located in the visited network and a computer located in another network by applying the encryption and authentication processing.

30 Claims, 9 Drawing Sheets

| CORRESPONDENT | PUBLIC KEY | SECRET KEY | KEY ENCRYPTION SCHEME | ENCRYPTION SCHEME | AUTHENTICATION SCHEME |
|---|---|---|---|---|---|
| GW1 | AB02 | DEU9 | DES | DES | MD5 |
| GW2 | HS82 | NJ33 | DES | T-DES | SHA |
| GW3 | KK27 | 9h27k | T-DES | RC4 | MD5 |
| GW4 | BKS2 | 1qayi | DES | DES | — |
| GW5 | GYU0 | 1huw | T-DES | — | MD5 |
| | | | | | |

MOBILE COMPUTER AND METHOD OF PACKET ENCRYPTION AND AUTHENTICATION IN MOBILE COMPUTING BASED ON SECURITY POLICY OF VISITED NETWORK

BACKGROUND OF THE INVENTION

1. Field of the Invention

The present invention relates to a mobile computer capable of carrying out cipher communications while moving among inter-connected networks, and a method of packet encryption and authentication suitable for a mobile computing.

2. Description of the Background Art

In conjunction with availability of a computer system in smaller size and lower cost and a more enriched network environment, the use of computer system has been rapidly expanded into variety of fields, and there is also a transition from a centralized system to a distributed system. In this regard, in recent years, because of the advance and spread of the computer network technology in addition to the progress and improved performance of the computer system itself, it has become possible to realize not only a sharing of resources such as files and printers within an office but also communications (electronic mail, electronic news, file transfer etc.) with outside of an office or organization, and these communications are now widely used.

In particular, in recent years, the use of the world's largest computer network called Internet has become very popular, and there are new computer businesses for connecting to the Internet and utilizing open information and services, or for providing information and services to external users who make accesses through the Internet. In addition, new technological developments are made in relation to the use of the Internet.

Also, in conjunction with the spread of such networks, there are technological developments regarding the mobile computing. In the mobile computing, a user carries along a portable computer terminal and makes communications while moving over networks. In some cases, the user may change a location on a network while continuing the communication, so that there is a need for a scheme that manages a changing address of a mobile computer on a network during such a communication in order to route the communication content correctly.

Also, when the networks are wide spread and free connections among networks are realized so that huge amount of data and services can be exchanged, there arises a need to account for the problem of security.

For example, there is a problem as to how to prevent the leakage of the secret information of the organization to the external network, and there is also a problem as to how to protect resources and information connected to the domestic network. The Internet was developed originally for the academic purpose so that the primary concern was the free data and service exchanges by the network connections and the above described problem of security has not been accounted for.

However, in recent years, many corporations and organizations are connecting to the Internet so that there is a need for a mechanism to guard the own network in view of the above described problem of security.

To this end, there is a known scheme for use at a time of exchanging a data packet on the Internet, in which the content of the data packet is to be encrypted and an authentication code is to be attached before the transmission of the data packet to the external, and the authentication code is to be verified and the data packet is to be decrypted at a received site.

For example, the IETF (which is the standardizing organization for the Internet) specifies the encryption and authentication code attaching scheme for IP packets as the IP security standard (see, IETF RFC1825–1829). According to this scheme, even when an outsider user picks up the data packet on the external network, the leakage of data content can be prevented because the data content is encrypted, and therefore the safe communication can be realized.

A mutual cipher communication is possible between networks which are protected (guarded) by gateway computers that support such a cipher communication, and when the above described mobile computer itself supports a function of the packet encryption and decryption, a cipher communication between any gateways or a gateway and a mobile computer can be supported.

Figure 1:
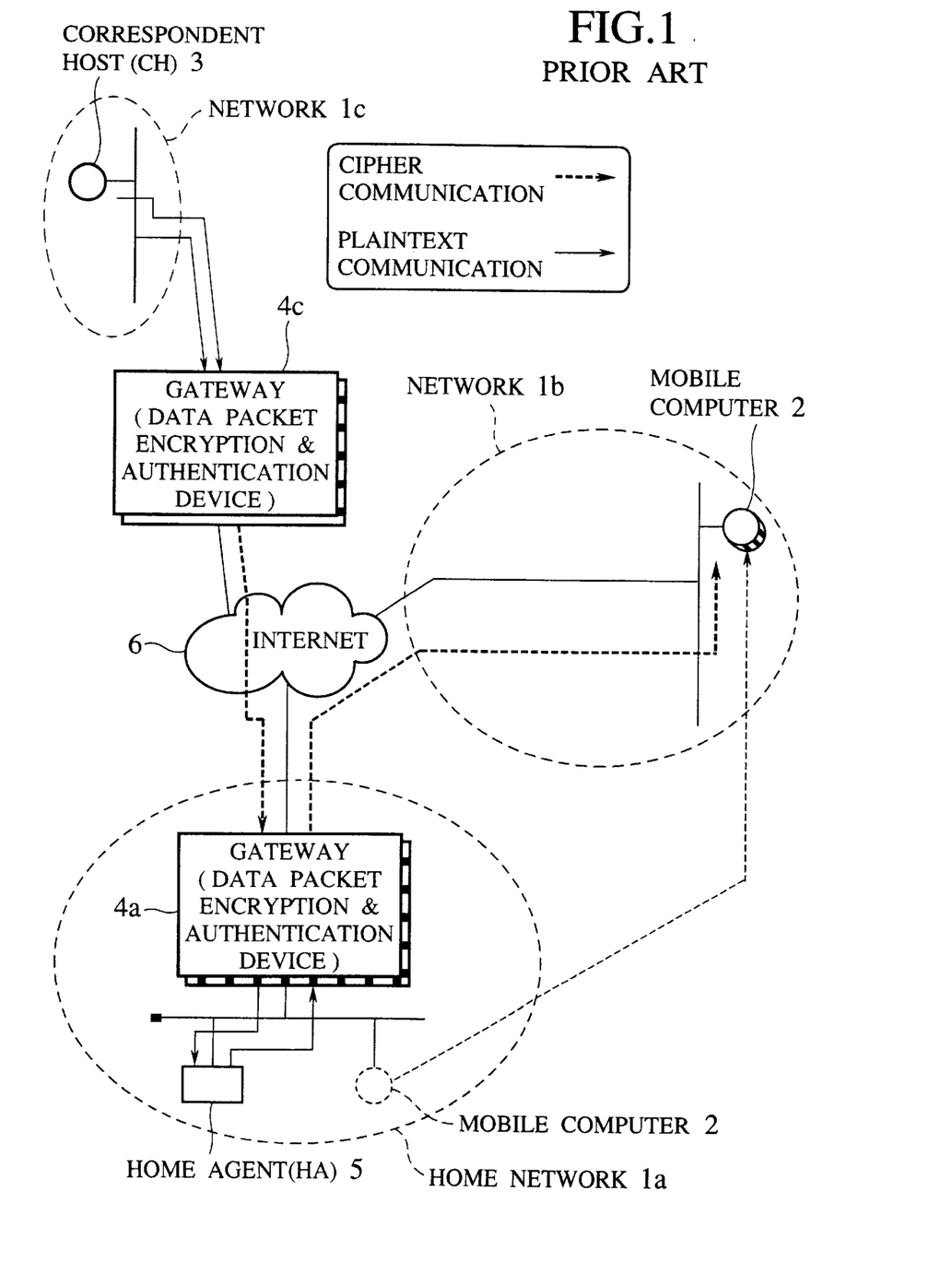
FIG. 1 is a diagram showing an exemplary conventional communication system supporting a mobile computing and a cipher communication.

For example, in an exemplary case shown in FIG. 1, a mobile computer 2 that originally belongs to a home network 1a moves to another network 1b and carries out a cipher communication with another computer (CH: Correspondent Host) 3 in a network 1c, through gateways (data packet encryption and authentication devices) 4a and 4c that support the encryption/decryption function.

In general, in a case of realizing the mobile computing, a router (home agent) for managing data on a visiting site of the mobile computer is provided, and the transmission of data destined to the mobile computer is realized by sending it to the home agent of the mobile computer, and carrying out the data routing control with respect to the mobile computer by encapsulating an IP packet destined to an original address of the mobile computer within a packet destined to a current location address of the mobile computer. In FIG. 1, this role is played by a home agent (HA) 5. This is a scheme called mobile IP which is currently in a process of being standardized by the mobile-IP working group of the IETF (see, IETF RFC2002, IP mobility support (C. Perkins)).

When this mobile IP scheme is used in combination with the above described data packet encryption of the IP security standard, a packet transfer route in FIG. 1 will be as follows: correspondent host (CH) 3→gateway 4c (where the packet is encrypted)→gateway 4a (where the packet is decrypted) →home agent (HA) 5→gateway 4a (where the packet is encrypted again)→mobile computer 2 (where the packet is decrypted again).

Now, in such a case of using the mobile IP in combination with the packet encryption of the IP security standard, the security policy may change depending on a visiting network of the mobile computer.

Figure 2:
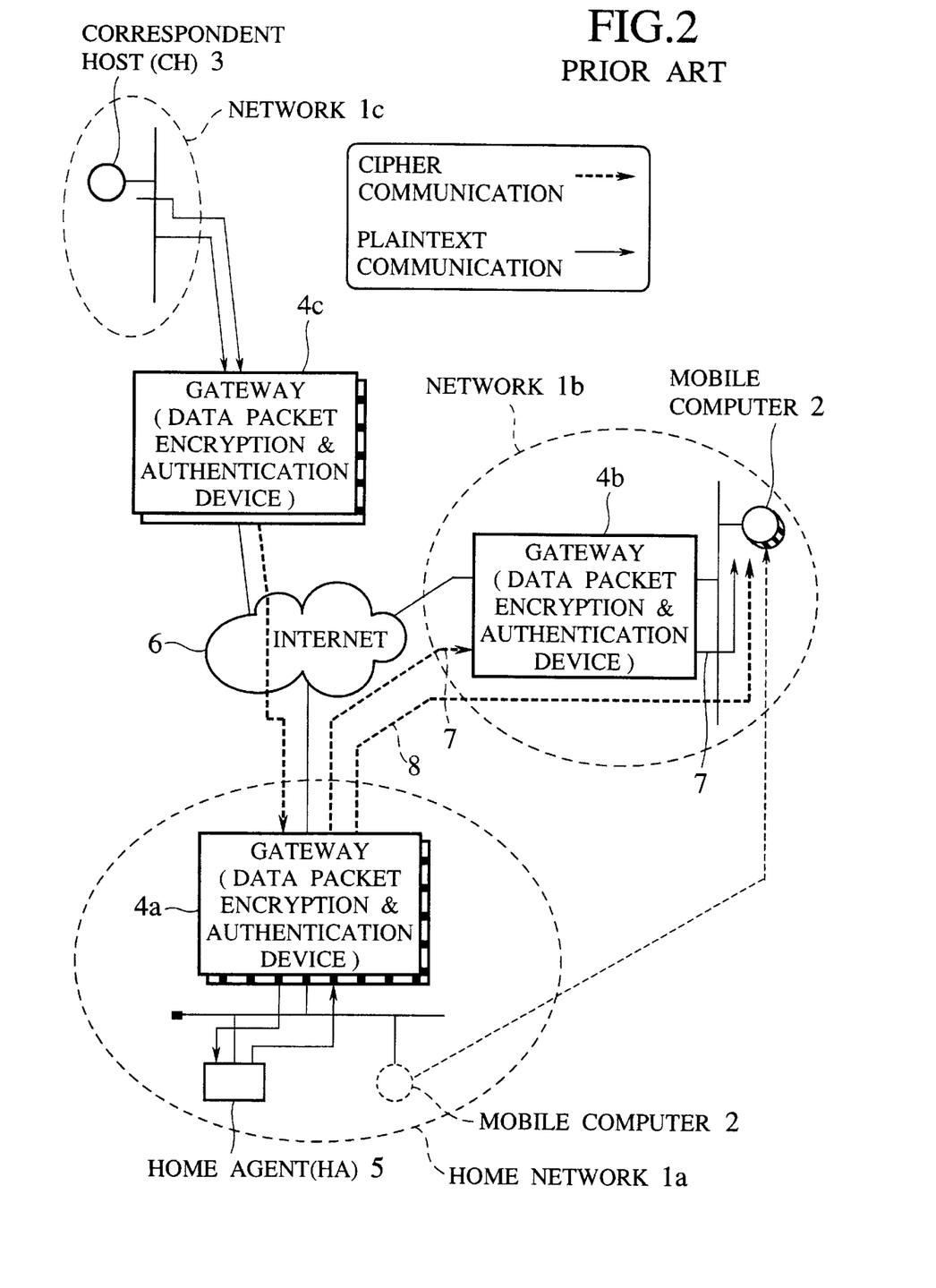
FIG. 2 is a diagram showing another exemplary conventional communication system supporting a mobile computing and a cipher communication.

For example, in another exemplary case shown in FIG. 2, suppose that the network 1b is operated by the same security policy as the home network 1a. Here, the same security policy for two networks means that, at the gateway of each network, the same packet encryption will be applied (or the packet encryption will not be applied) with respect to a communication between a computer within the own network and any correspondent host who is located outside these two networks.

When the mobile computer 2 moves to the network 1b that has the same security policy as the home network 1a, the same packet as that which would have been generated in a case of transmission within the home network 1a can be generated regardless of whether the packet encryption processing is carried out by the packet encryption function provided in the mobile computer 2 itself or by the gateway 4b. Consequently, in such a case, the control can be made simpler by not activating the packet encryption function within the mobile computer 2 and carrying out the packet encryption processing at the gateway 4b, as indicated by a lines 7 in FIG. 2, and this is also preferable from a viewpoint of the network management.

In contrast, in FIG. 2, suppose that the network 1b is operated by the security policy different from that of the home network 1a.

When the mobile computer 2 moves to the network 1b that has the security policy different from that of the home network 1a, it is not possible to generate the encrypted packet which is equivalent to that which would have been generated in a case of transmission within the home network 1a unless the packet encryption function of the mobile computer 2 is used. Consequently, in such a case, in order to operate the mobile computer 2 that moved to the network 1b by the same security policy as that of the home network 1a, it is necessary to carry out the packet encryption processing by the packet encryption function of the mobile computer 2 itself, as indicated by lines 8 in FIG. 2.

Moreover, as in a case shown in FIG. 1, when there is no gateway that has the packet encryption function at the visited site (because having no packet encryption function is one possible security policy), in order to carry out a cipher communication, it becomes inevitable to carry out the packet encryption processing by the packet encryption function of the mobile computer 2 itself.

However, conventionally, in a case of carrying out the packet encryption at the packet encryption device belonging to the mobile computer by using the encryption scheme according to the mobile IP and the IP security standard, the packet encryption processing is carried out by the packet encryption device belonging to the mobile computer without accounting for the visited site, so that the processing efficiency has been poor.

Also, in general, the mobile computer requires a complicated network management processing, so that the above described conventionally required processing is also poor in efficiency from a viewpoint of the network management.

SUMMARY OF THE INVENTION

It is therefore an object of the present invention to provide a mobile computer and a packet encryption and authentication method which are capable of controlling an activation of a packet encryption and authentication device belonging to the mobile computer according to the security policy at the visited network of the mobile computer.

According to one aspect of the present invention there is provided a mobile computer for carrying out communications while moving among inter-connected networks, comprising: a packet encryption and authentication unit having an ON/OFF switchable function for applying an encryption and authentication processing on input/output packets of the mobile computer; and a control unit for realizing the communications by receiving/transmitting the input/output packets by selectively controlling one of the packet encryption and authentication unit and an external packet processing device to carry out the encryption and authentication processing on the input/output packets, the external packet processing device being provided in a visited network at which the mobile computer is located and having a function for relaying packets transferred between a computer located in the visited network and a computer located in another network by applying the encryption and authentication processing.

According to another aspect of the present invention there is provided a packet encryption and authentication method for use in a mobile computer for carrying out communications while moving among inter-connected networks, the mobile computer being provided with a packet encryption and authentication unit for applying an encryption and authentication processing on input/output packets of the mobile computer, the method comprising the steps of: selecting one of the packet encryption and authentication unit and an external packet processing device which is provided in a visited network at which the mobile computer is located and having a function for relaying packets transferred between a computer located in the visited network and a computer located in another network by applying the encryption and authentication processing; and controlling a selected one of the packet encryption and authentication unit and the external packet processing device to carry out the encryption and authentication processing on the input/output packets, by setting the packet encryption and authentication unit ON when the packet encyrption and authentication unit is selected, and setting the packet encryption and authentication unit OFF when the external packet processing device is selected.

According to another aspect of the present invention there is provided an article of manufacture, comprising: a computer usable medium having computer readable program code means embodied therein for causing a computer to function as a mobile computer for carrying out communications while moving among inter-connected networks, the computer readable program code means including: first computer readable program code means for causing said computer to realize a packet encryption and authentication unit having an ON/OFF switchable function for applying an encryption and authentication processing on input/output packets of the mobile computer; and second computer readable program code means for causing said computer to realize the communications by receiving/transmitting the input/output packets by selectively controlling one of the packet encryption and authentication unit and an external packet processing device to carry out the encryption and authentication processing on the input/output packets, the external packet processing device being provided in a visited network at which the mobile computer is located and having a function for relaying packets transferred between a computer located in the visited network and a computer located in another network by applying the encryption and authentication processing.

Other features and advantages of the present invention will become apparent from the following description taken in conjunction with the accompanying drawings.

DETAILED DESCRIPTION OF THE PREFERRED EMBODIMENTS

Referring now to FIG. 3 to FIG. 6, the first embodiment of a mobile computer and a packet encryption and authentication method according to the present invention will be described in detail.

Figure 3:
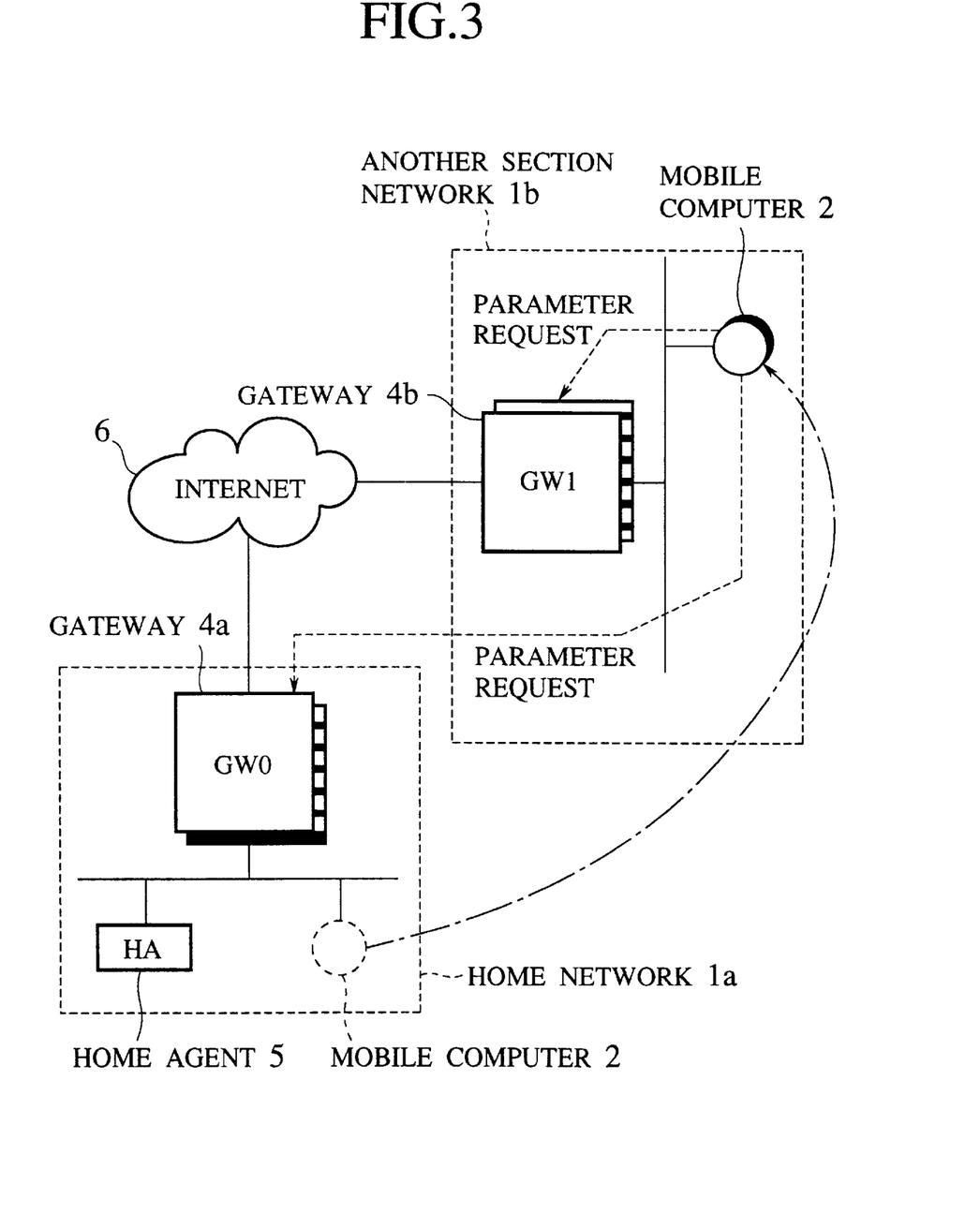
FIG. 3 is a diagram showing a communication system using a mobile computer and a packet encryption and authentication method according to the present invention.

FIG. 3 shows an exemplary basic configuration of a communication system according to the present invention, where a home network 1a of a mobile computer 2 and another section network 1b are connected through the Internet 6.

The communication system of FIG. 3 has the same basic structure as those shown in FIG. 1 and FIG. 2 described above. Namely, it is assumed that the mobile computing and the cipher communication are supported by the mobile IP and the IP security standard as described above.

In FIG. 3, a home agent 5 for managing an information on a current location at a visited site of the mobile computer is provided in the home network 1a. A number of mobile computers to be managed is arbitrary. Also, as described above, the transferred IP packet destined to the moving mobile computer 2 is sent to the home agent 5 of the mobile computer 2, and the data routing control with respect to the mobile computer 2 is carried out by encapsulating an IP packet destined to an original address (an address in a home network 1a) of the mobile computer 2 within a packet destined to a current location address of the mobile computer 2.

Also, gateways (packet processing devices) 4a and 4b are provided in the networks 1a and 1b, respectively. In this first embodiment, it is assumed that each gateway has the packet encryption and authentication processing function. Note that the encryption of communication data can be realized by a scheme disclosed in IETF RFC1825, 1827 and the attaching of authentication code can be realized by a scheme disclosed In IETF RFC1825, 1826, for example.

Figure 5:
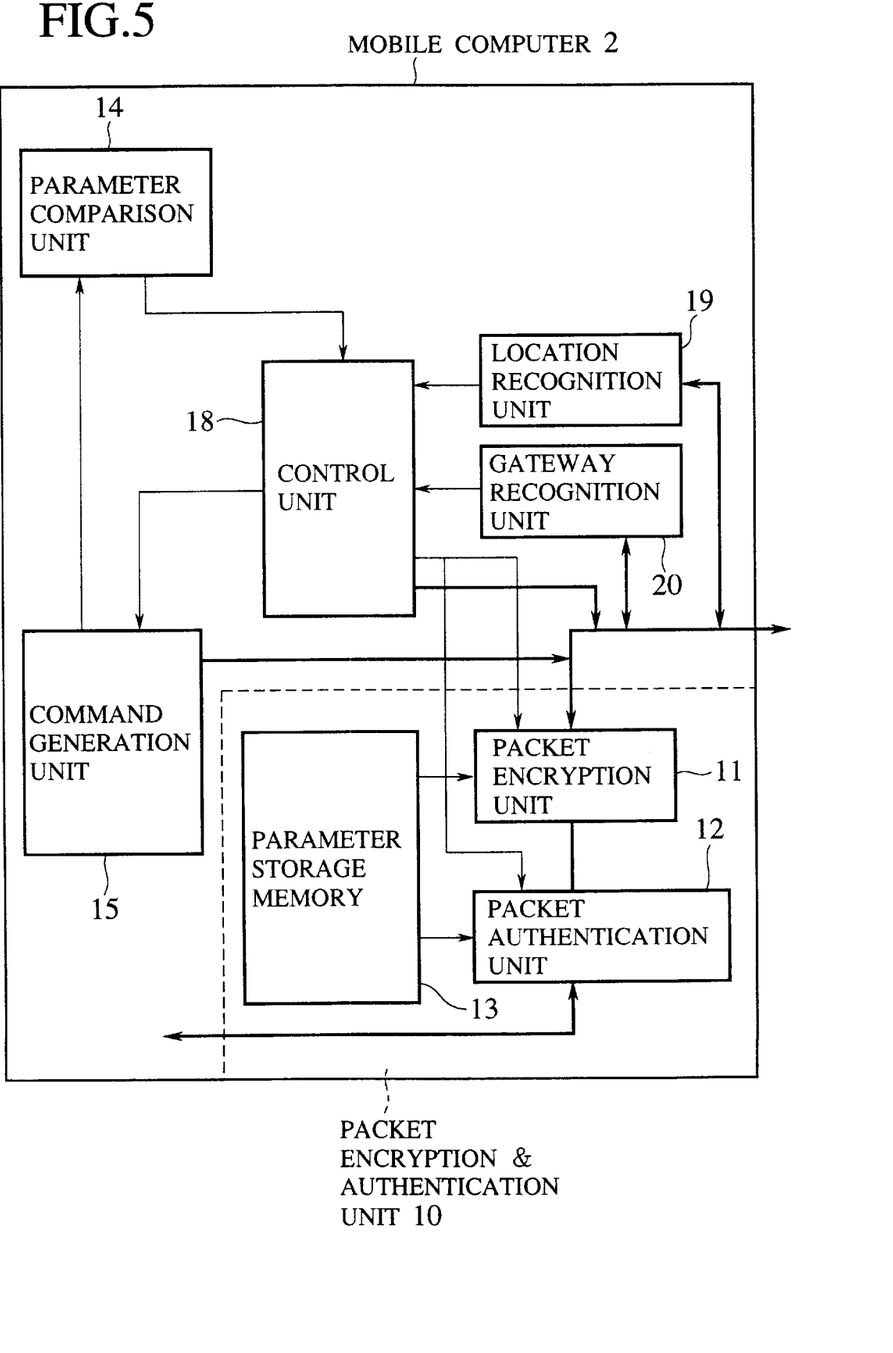
FIG. 5 is a schematic block diagram of a mobile computer according to the first embodiment of the present invention.

In this first embodiment, the mobile computer 2 is in a schematic configuration as shown in FIG. 5 which will be described in further detail below, and which has a packet encryption and authentication unit 10.

Also, the mobile computer 2 has a location recognition unit 19 for recognizing that the mobile computer 2 is located outside the network (home network) 1a at which the home agent 5 for managing this mobile computer 2 is provided. This location recognition can be realized, for example, by judging whether the mobile computer 2 is located within the home network or not according to whether or not it is possible to receive the advertisement message that is regularly transmitted by the home agent 5.

The mobile computer 2 also has a gateway recognition unit 20 for recognizing a gateway (or its absence) that takes the mobile computer 2 itself as the processing target. This gateway recognition can be realized, for example, by providing a server device for managing a database of information (such as an information on a correspondence between a network address of each gateway and network addresses of a group of computers that are the processing targets of each gateway) that indicates which gateway takes the packet of which computer as the processing target, somewhere within the communication system (which may be distributed), and by controlling the mobile computer 2 to search this database.

Note that, when a packet encryption and authentication device equipped with an encryption and authentication processing function is to be provided separately from the gateway, this gateway recognition unit should be changed to a packet encryption and authentication device recognition unit.

Next, an exemplary processing procedure in a case where the mobile computer 2 belonging to the home network 1a has moved to another section network 1b in the communication system of FIG. 3 will be described.

(1) The mobile computer 2 judges whether it is located inside its own home network 1a or outside the home network by using the location recognition unit 19.

When it is judged that it has moved outside the home network, the mobile computer 2 acquires an address to be used in a visited network by using the protocol such as DHCP or PPP, at a visited network (which is 1b in this example).

When the address is acquired, the mobile computer 2 transmits a registration message containing an information on a current location to the home agent 5 of the home network 1a.

The home agent 5 of the home network 1a of the mobile computer 2 registers an information capable of uniquely identifying a location of the mobile computer 2 within the entire networks into a management table of the home agent 5 (and, at this point, the home agent 5 recognizes that the mobile computer 2 has moved outside the home network 1a).

Also, at the visited network 1b, a setting is made in a management table of the gateway 4a so that a packet transferred from the Internet 6 side which is destined to this mobile computer 2 will be transferred to the home agent 5.

By means of the above, a packet destined to the mobile computer 2 that is transferred from the Internet 6 to the home network 1a of the mobile computer 2 will be given to the home agent 5 once, and further transferred to a visiting site of the mobile computer 2 from there. At this point, at the home agent 5, the processing for encapsulating an IP packet destined to the original address (address in the home network 1a) of the mobile computer 2 within a packet destined to a current location address of the mobile computer 2 as described above will be carried out.

(2) Also, at the visited network 1b, the mobile computer 2 is registered into the management table of the gateway 4b. At this point, attributes indicating that it is a mobile computer and that it is not a processing target of the encryption and authentication processing of this gateway 4b are registered.

By means of the above, a packet transferred from the Internet 6 to the gateway 4b will be given to the mobile computer 2 without having the encryption and authentication processing (that is, the decryption and the authentication code verification) applied by the gateway 4b. Also, a packet transferred from the mobile computer 2 to the gateway 4b will be transmitted to the Internet 6 without having the encryption and authentication processing applied by the gateway 4b.

Now, in this first embodiment, either after the above processing (2) takes place or before the above processing (2) takes place, if a packet processing device exists in the visited network, the mobile computer 2 carries out a control processing for comparing a security parameter set held by that packet processing device with a security parameter set suitable for the mobile computer 2, selecting the packet encryption and authentication unit of either the gateway or the mobile computer 2 itself according to the comparison result, and controlling the selected packet encryption and authentication unit to carry out the encryption and authentication processing.

Note that, in this first embodiment, the security parameter set suitable for the mobile computer 2 is assumed to be identical to the security parameter set of the home network of the mobile computer 2, but it can be defined in any other desirable form according to the network management policy.

This processing is carried out by the following procedure in outline.

When the mobile computer 2 recognizes that it is located outside its own home network 1a by using the location recognition unit 19, and that there is a gateway (or a packet encryption and authentication device) that takes this mobile computer 2 as the processing target by using the gateway recognition unit 20, the mobile computer 2 acquires a security parameter set of the gateway 4a of the home network 1a and a security parameter set of the gateway 4b of the visited network 2b.

Figure 4:
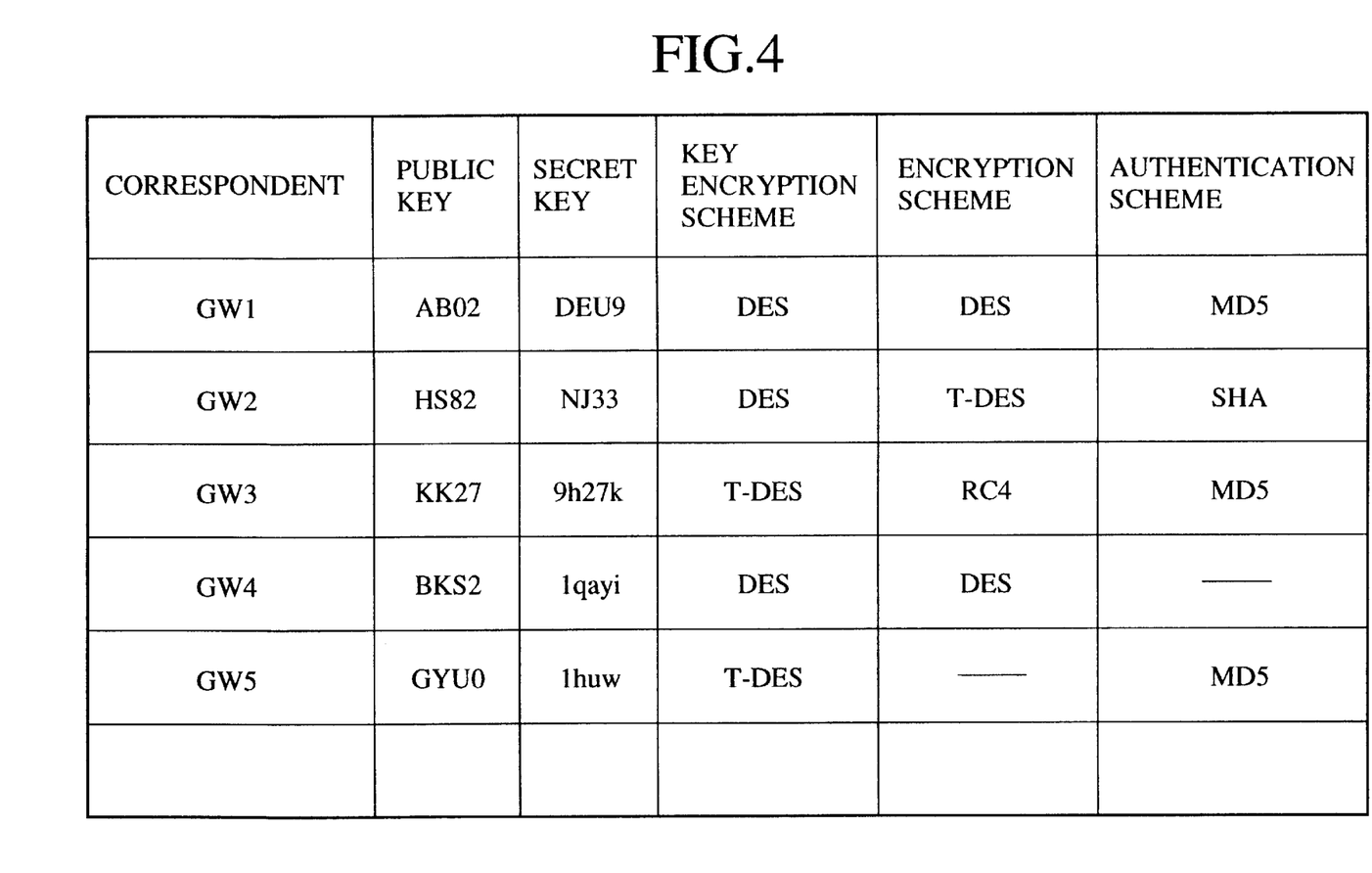
FIG. 4 is a table showing an exemplary security parameter set for one gateway with respect to other gateways used in the first embodiment of the present invention.

Here, FIG. 4 shows an example of a security parameter set of the gateway 4a (which will be taken here as GW0) in the home network 1a of the mobile computer 2 with respect to the other gateways GW1, GW2, GW3, GW4, GW5, etc. Similarly, the gateway 4b (which will be taken here as GW1) of the visited network 1b also has a security parameter set with respect to the other gateways GW0, GW2, GW3, GW4, GW5, etc.

The mobile computer 2 compares these security parameter sets, and if they are identical except for portions related to the visited network 1b and the home network 1a (which are different by definition), the mobile computer 2 sets its own packet encryption and authentication unit 10 OFF and issues a request for changing the attributes of the mobile computer 2 in the management table of the gateway 4b of the visited network 1b so that this mobile computer 2 becomes the processing target of the encryption and authentication processing at the gateway 4b. Here, in a case of carrying out this processing prior to the above processing (2), the mobile computer 2 issues a request for registering this mobile computer 2 into the management table of the gateway 4b by registering the attributes indicating that it is a mobile computer and that it is a processing target of the encryption and authentication processing of this gateway 4b. In such a case, the above processing (2) will not be carried out.

By means of the above, a packet transferred from the Internet 6 to the gateway 4b will be given to the mobile computer 2 after the encryption and authentication processing (that is, the decryption and the authentication code verification) is applied by the gateway 4b. Also, a packet transferred from this mobile station 2 to the gateway 4b will be transmitted to the Internet 6 after the encryption and authentication processing is applied by the gateway 4b.

Now, with reference to FIG. 5, a configuration of the mobile computer 2 according to the first embodiment will be described in detail.

This mobile computer 2 of FIG. 5 comprises: a packet encryption and authentication unit 10 including a packet encryption unit 11, a packet authentication unit 12, and a parameter storage memory 13; a parameter comparison unit 14; a command generation unit 15; and a control unit 18.

The packet encryption unit 11 and the packet authentication unit 12 constitute a module for generating a prescribed encrypted packet or decrypted packet by carrying out the encryption and the authentication code attaching with respect to a packet to be transmitted or the authentication code verification and the decryption with respect to a received packet.

The parameter storage memory 13 is used when the mobile computer 2 carries out the encryption and authentication processing by itself. This parameter storage memory 13 holds a security parameter set to be used in the encryption and the authentication with respect to various correspondents. A security parameter set include the encryption scheme, authentication scheme, key information, etc.

The parameter comparison unit 14 constitutes a module for comparing two sets of parameter information and judges whether they match with each other or not.

The command generation unit 15 constitutes a module for generating a request command with respect to external modules. This command generation unit 15 is used, for example, in generating security parameter transmission request commands with respect to the gateway of the home network and the gateway of the visited network.

The control unit 18 constitutes a module for carrying out a control operation of the mobile computer 2 including the ON/OFF control of the functions of the packet encryption unit 11 and the packet authentication unit 12, according to control signals from the parameter comparison unit 14.

As indicated in FIG. 3, at the mobile computer 2 inside the visited network 1b, the security parameter transmission request commands with respect to the gateway 4a of the home network 1a and the gateway 4b of the visited network 1b are generated and transmitted by the command generation unit 15. When responses containing security parameter sets are received from the requested gateways, they are compared at the parameter comparison unit 14. Then, the parameter comparison unit 14 carries out the prescribed operation control with respect to the control unit 18 so as to set the functions of the packet encryption unit 11 and the packet authentication unit 12 OFF when these security parameter sets match, or to set the functions of the packet encryption unit 11 and the packet authentication unit 12 ON when these security parameter sets do not match.

Figure 6:
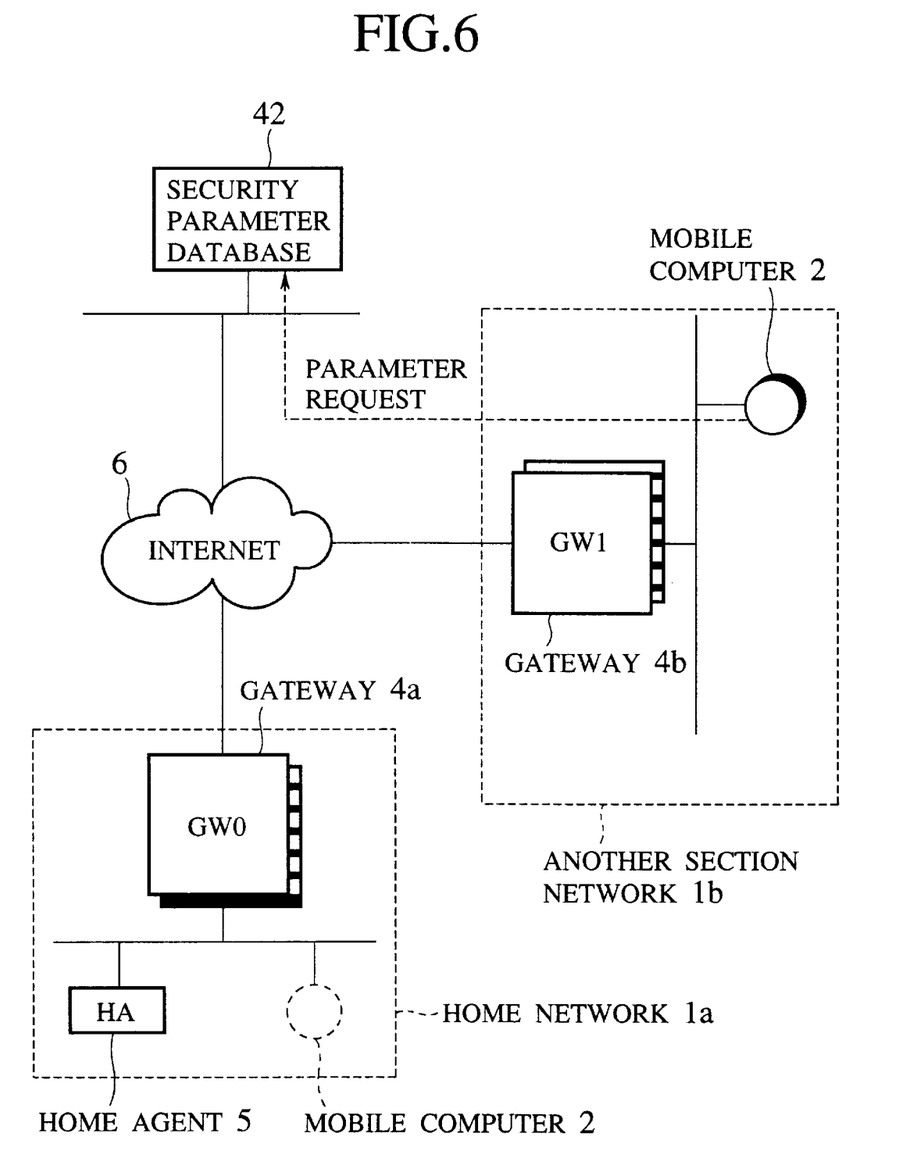
FIG. 6 is a diagram showing a modified configuration of the communication system of FIG. 3 that can be used in the first embodiment of the present invention.

Note that, in the above, the security parameter sets are directly acquired from the gateways by means of the request commands generated by the command generation unit 15, but as indicated in FIG. 6, it is also possible to provide a security parameter database 42 for managing correspondences between the gateways and the security parameter sets in a form of database, within the communication system.

In this case, the mobile computer 2 makes an access to the security parameter database 42, and receives the security parameter information for the gateways 4a and 4b of the home network 1a and the visited network 1b. When this information is received, these security parameter sets are compared at the parameter comparison unit 14. Then, the parameter comparison unit 14 carries out the prescribed operation control with respect to the control unit 18 so as to set the functions of the packet encryption unit 11 and the packet authentication unit 12 OFF when these security parameter sets match, or to set the functions of the packet encryption unit 11 and the packet authentication unit 12 ON when these security parameter sets do not match.

It is also possible to carry the security parameter set of the gateway 4a of the home network 1a within the mobile computer 2 while the mobile computer 2 moves. In this case, the inquiry with respect to the gateway 4a of the home network 1a or the security parameter database 42 becomes unnecessary.

As described, according to this first embodiment, when the location information of the mobile computer is detected, and it is judged that the security policy of the visited network is the same as the security policy of its own home network, the packet encryption and authentication unit 10 belonging to the mobile computer 2 is set OFF and the packet encryption and authentication processing is entrusted to the gateway of the visited network so as to improve the packet processing efficiency and simplify the network management processing at the same time. When the security policy of the visited network is different from the security policy of the home network, it is still possible to realize the cipher communication just as in a case of being located inside the home network by directly using the packet encryption and authentication unit belonging to the mobile computer itself.

Consequently, it is possible to guarantee the operations equivalent to those in a case of transmitting a packet from the home network, regardless of the visited network to which the mobile computer has moved.

Figure 7:
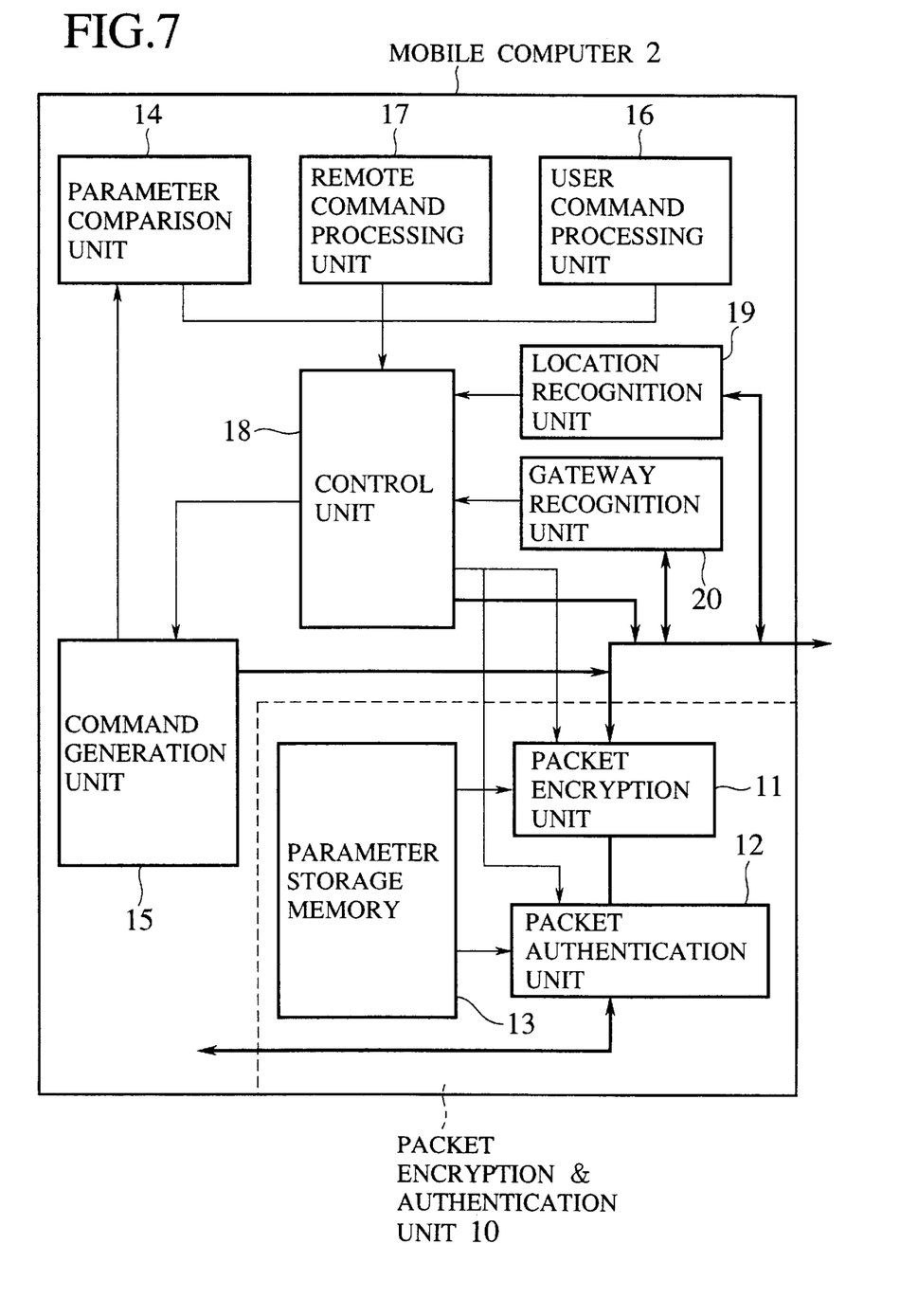
FIG. 7 is a schematic block diagram of a mobile computer according to the second embodiment of the present invention.
Figure 8:
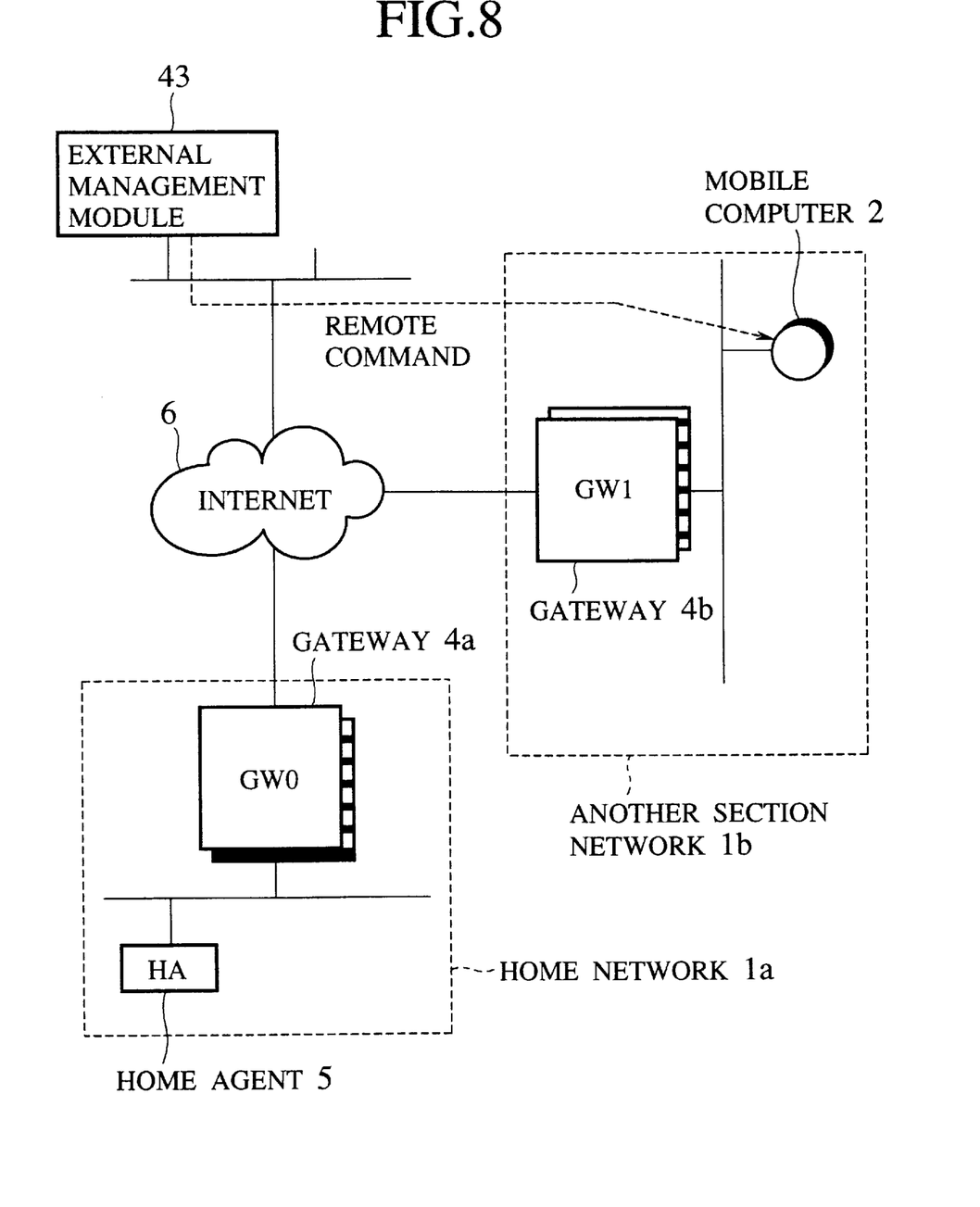
FIG. 8 is a diagram showing a modified configuration of the communication system of FIG. 3 that can be used in the second embodiment of the present invention.

Referring now to FIG. 7 and FIG. 8, the second embodiment of a mobile computer and a packet encryption and authentication method according to the present invention will be described in detail.

In this second embodiment, the communication system has the same configuration as that of FIG. 3 described above.

FIG. 7 shows a schematic configuration of the mobile computer 2 according to the second embodiment.

This mobile computer 2 of FIG. 7 differs from that of FIG. 5 in that a user command processing unit 16 and/or a remote command processing unit 17 are additionally provided.

The user command processing unit 16 constitutes a module for processing a command for controlling the packet encryption and authentication unit 10 which is to be entered into the mobile computer 2 directly by a system manager.

The remote command processing unit 17 constitutes a module for processing a remote command for controlling the packet encryption and authentication unit 10 which is to be transmitted from an external module.

In this second embodiment, the control unit 18 carries out the ON/OFF control of the functions of the packet encryption unit 11 and the packet authentication unit 12, according to control signals from the parameter comparison unit 14, the user command processing unit 16 and the remote command processing unit 17.

There are cases in which the system manager wishes to control the packet encryption and authentication unit 10 of the mobile computer 2 by the manual operation for the purpose of the general system running and maintenance. In such a case, the operation control of the packet encryption and authentication unit 10 can be realized by either entering a prescribed control command into the user command processing unit 16 or processing a remote command transmitted from an external management module 43 that is provided in the communication system as shown in FIG. 8 at the remote command processing unit 17, and entering the resulting control signal into the control unit 18.

For example, while the current setting requires the packet encryption and authentication unit 10 belonging to the mobile computer 2 to carry out the encryption and authentication processing, when a command to set the functions of the packet encryption unit 11 and the packet authentication unit 12 OFF is given to the mobile computer 2 by the user command or the remote command, the similar operation as in a case where the security parameter sets of the home network 1a and the visited network 1b match as described above is carried out, so as to entrust the encryption and authentication processing to the gateway 4b of the visited network 1b.

On the contrary, while the current setting requires gateway 4b of the visited network 1b to carry out the encryption and authentication processing, when a command to set the functions of the packet encryption unit 11 and the packet authentication unit 12 ON is given to the mobile computer 2 by the user command or the remote command, the similar operation as in a case where the security parameter sets of the home network 1a and the visited network 1b did not match as described above is carried out, so as to change the setting to require the packet encryption and authentication unit 10 belonging to the mobile computer 2 to carry out the encryption and authentication processing.

Note that, apart from the above, it is also possible to provide a command for specifying the switching to the communication that does not use the encryption and authentication processing, by setting the functions of the packet encryption unit 11 and the packet authentication unit 12 belonging to the mobile computer 2 OFF (without entrusting the encryption and authentication processing to the gateway 4b of the visited network 1b).

Figure 9:
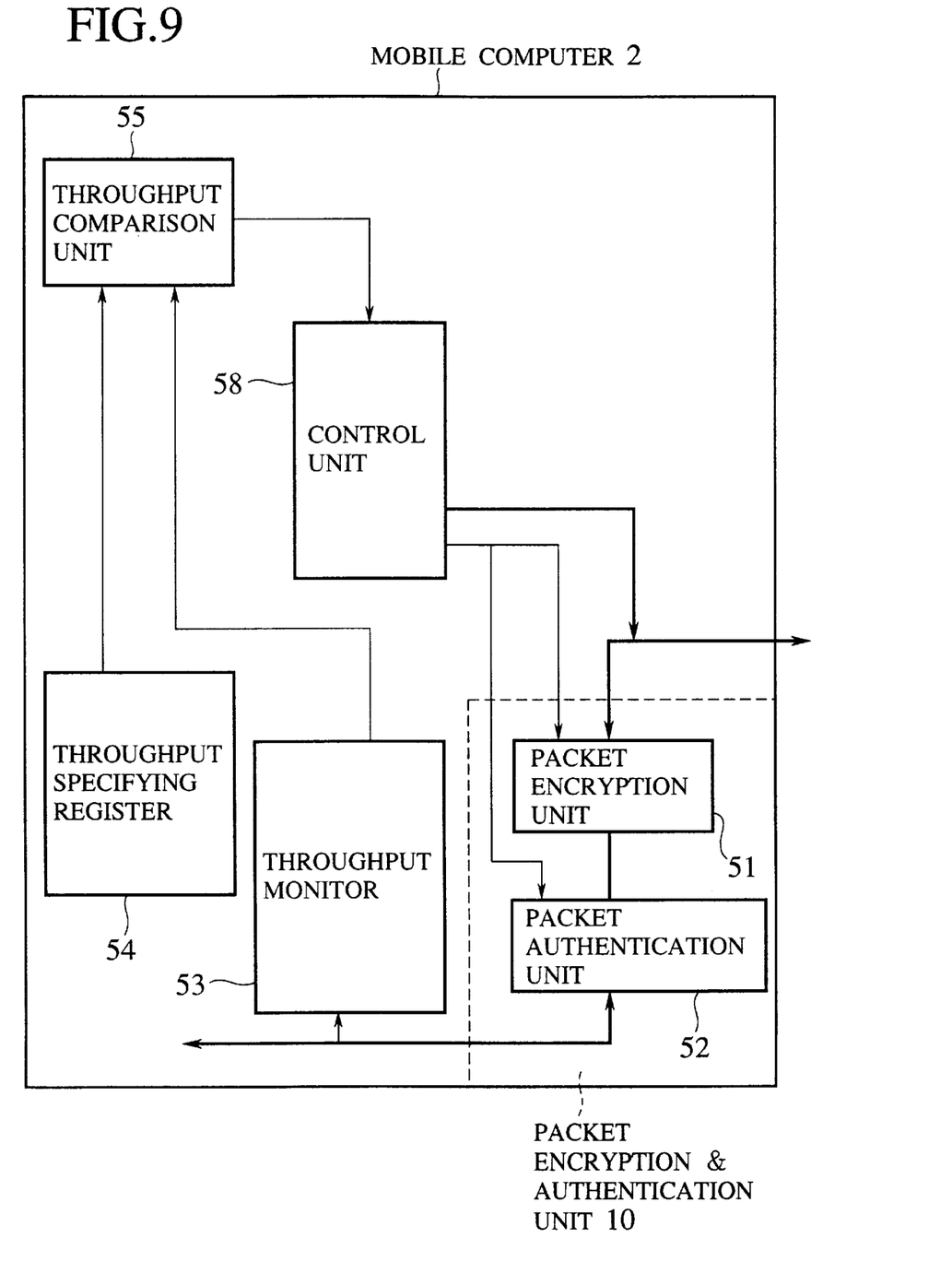
FIG. 9 is a schematic block diagram of a mobile computer according to the third embodiment of the present invention.

Referring now to FIG. 9, the third embodiment of a mobile computer and a packet encryption and authentication method according to the present invention will be described in detail.

In this third embodiment, the communication system has the same configuration as that of FIG. 3 described above.

FIG. 9 shows a schematic configuration of the mobile computer 2 according to the third embodiment.

The above described first and second embodiments are basically directed to a case in which the packet encryption and authentication unit belonging to the mobile computer is set OFF when the security policy of the visited network matches with the security policy of the home network of the mobile computer, so as to entrust the packet encryption and authentication processing to the gateway of the visited network.

In contrast, this third embodiment is directed to a case in which the packet encryption and authentication processing is to be entrusted to the gateway of the visited network when the data transfer throughput (packet transfer rate) of the mobile computer becomes lower than a prescribed reference value, in order to relieve the processing load required by the packet encryption and authentication processing from the mobile computer, regardless of whether or not the security policies match.

This mobile computer 2 of FIG. 9 comprises: a packet encryption and authentication unit 10 formed by a packet encryption unit 51 and a packet authentication unit 52; a throughput monitor 53; a throughput specifying register 54; a throughput comparison unit 55; and a control unit 58.

Here, the packet encryption unit 51 and the packet authentication unit 52 are substantially similar to those of FIG. 5 and FIG. 7 described above.

The throughput monitor 53 constitutes a module for dynamically monitoring the data transfer throughput (packet transfer rate) of the mobile computer 2, while the throughput specifying register 54 is a register for setting the minimum throughput value tolerable by the user.

The throughput comparison unit 55 compares the monitored throughput value obtained by the throughput monitor 53 and the minimum throughput value set in the throughput specifying register 54, and sends a control signal to set the packet encryption unit 51 and the packet authentication unit 52 OFF to the control unit 58 when the monitored throughput value is smaller, so as to stop the packet encryption and authentication processing. Then, when the monitored value becomes larger than the minimum throughput value again, the throughput comparison unit 55 sends a control signal to set the packet encryption unit 51 and the packet authentication unit 52 ON to the control unit 58 so as to resume the packet encryption and authentication processing.

Note that, in the above, only a single reference value is used for the ON/OFF control, but it is also possible to use two different reference values including a first reference value for judging the OFF timing and a second reference value for judging the ON timing. Here, it is effective to set the second reference value larger than the first reference value in order to prevent the excessively frequent occurrences of the ON/OFF switching.

As described, in this third embodiment, the data transfer throughput (packet transfer rate) of the mobile computer itself is dynamically monitored and the encryption and authentication functions that can cause the throughput lowering are set OFF when the monitored throughput value becomes lower than a prescribed reference value, so that the mobile computer can be controlled in such a manner that it is possible to guarantee the operation state above a prescribed level in the mobile computer, even under the mobile computing environment.

Note that it is also possible to add the user command processing unit 16 and/or the remote command processing unit 17 of the second embodiment into the packet encryption and authentication unit of FIG. 9.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the mobile computer in any of the above described configurations of FIGS. 5, 7 and 9 can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that the present invention is equally applicable to any of the currently proposed mobile communication protocols, the cipher communication protocols, and the secret key exchange protocols.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A mobile computer for carrying out communications while moving among inter-connected networks, comprising:

a packet encryption and authentication unit having an ON/OFF switchable function for applying an encryption and authentication processing on input/output packets of the mobile computer; and a control unit for realizing the communications by receiving/transmitting the input/output packets by selectively controlling one of the packet encryption and authentication unit and an external packet processing device to carry out the encryption and authentication processing on the input/output packets, the external packet processing device being provided in a visited network at which the mobile computer is located and having a function for relaying packets transferred between a computer located in the visited network and a computer located in another network by applying the encryption and authentication processing.

2. The mobile computer of claim 1, wherein the external packet processing device applies the encryption and authentication processing according to a first security policy defined for the external packet processing device; and the control unit selects one of the packet encryption and authentication unit and the external packet processing device by comparing the first security policy with a second security policy suitable for the mobile computer.

3. The mobile computer of claim 2, wherein the first security policy is indicated by a first security parameter set defined for the external packet processing device, while the second security policy is indicated by a second security parameter set defined for a packet processing device in a home network of the mobile computer.

4. The mobile computer of claim 2, wherein the control unit selects the external packet processing device when the first security policy matches with the second security policy, or the packet encryption and authentication unit otherwise.

5. The mobile computer of claim 1, further comprising:

a first judging unit for judging whether or not the mobile computer is located outside a home network of the mobile computer; and a second judging unit for judging whether or not the external packet processing device exists in a currently visited network at which the mobile computer is currently located;

wherein the control unit carries out the selectively controlling when the first judging unit judges that the mobile computer is located outside the home network and the second judging unit judges that the external packet processing device exists in the currently visited network.

6. The mobile computer of claim 1, wherein the control unit selects one of the packet encryption and authentication unit and the external packet processing device according to a user command entered into the mobile computer from an external.

7. The mobile computer of claim 1, wherein the control unit selects one of the packet encryption and authentication unit and the external packet processing device according to a remote command transmitted from an external management module provided in the inter-connected networks and received at the mobile computer.

8. The mobile computer of claim 1, further comprising:
a monitoring unit for monitoring a packet transfer rate of the mobile computer;
wherein the control unit selects one of the packet encryption and authentication unit and the external packet processing device according to the packet transfer rate monitored by the monitoring unit.

9. The mobile computer of claim 8, wherein the control unit selects the external packet processing device when the packet transfer rate monitored by the monitoring unit is lower than a reference value.

10. The mobile computer of claim 8, wherein the control unit selects the external packet processing device when the packet transfer rate monitored by the monitoring unit becomes lower than a first reference value, and the control unit selects the packet encryption and authentication unit when the packet transfer rate monitored by the monitoring unit becomes higher than a second reference value, where the second reference value is greater than the first reference value.

11. A packet encryption and authentication method for use in a mobile computer for carrying out communications while moving among inter-connected networks, the mobile computer being provided with a packet encryption and authentication unit for applying an encryption and authentication processing on input/output packets of the mobile computer, the method comprising the steps of:
selecting one of the packet encryption and authentication unit and an external packet processing device which is provided in a visited network at which the mobile computer is located and having a function for relaying packets transferred between a computer located in the visited network and a computer located in another network by applying the encryption and authentication processing; and
controlling a selected one of the packet encryption and authentication unit and the external packet processing device to carry out the encryption and authentication processing on the input/output packets, by setting the packet encryption and authentication unit ON when the packet encyrption and authentication unit is selected, and setting the packet encryption and authentication unit OFF when the external packet processing device is selected.

12. The method of claim 11, wherein the external packet processing device applies the encryption and authentication processing according to a first security policy defined for the external packet processing device; and
the selecting step selects one of the packet encryption and authentication unit and the external packet processing device by comparing the first security policy with a second security policy suitable for the mobile computer.

13. The method of claim 12, wherein the first security policy is indicated by a first security parameter set defined for the external packet processing device, while the second security policy is indicated by a second security parameter set defined for a packet processing device in a home network of the mobile computer.

14. The method of claim 12, wherein the selecting step selects the external packet processing device when the first security policy matches with the second security policy, or the packet encryption and authentication unit otherwise.

15. The method of claim 11, further comprising the step of:
judging whether or not the mobile computer is located outside a home network of the mobile computer; and
judging whether or not the external packet processing device exists in a currently visited network at which the mobile computer is currently located;
wherein the selecting step makes a selection when the mobile computer is judged to be located outside the home network and the external packet processing device is judged to be existing in the currently visited network.

16. The method of claim 11, wherein the selecting step selects one of the packet encryption and authentication unit and the external packet processing device according to a user command entered into the mobile computer from an external.

17. The method of claim 11, wherein the selecting selects one of the packet encryption and authentication unit and the external packet processing device according to a remote command transmitted from an external management module provided in the inter-connected networks and received at the mobile computer.

18. The method of claim 11, further comprising the step of:
monitoring a packet transfer rate of the mobile computer;
wherein the selecting step selects one of the packet encryption and authentication unit and the external packet processing device according to the packet transfer rate monitored by the monitoring step.

19. The method of claim 18, wherein the selecting step selects the external packet processing device when the packet transfer rate monitored by the monitoring step is lower than a reference value.

20. The method of claim 18, wherein the selecting step selects the external packet processing device when the packet transfer rate monitored by the monitoring step becomes lower than a first reference value, and the selectively controlling step selects the packet encryption and authentication unit when the packet transfer rate monitored by the monitoring step becomes higher than a second reference value, where the second reference value is greater than the first reference value.

21. An article of manufacture, comprising:
a computer usable medium having computer readable program code means embodied therein for causing a computer to function as a mobile computer for carrying out communications while moving among inter-connected networks, the computer readable program code means including:
first computer readable program code means for causing said computer to realize a packet encryption and authentication unit having an ON/OFF switchable function for applying an encryption and authentication processing on input/output packets of the mobile computer; and
second computer readable program code means for causing said computer to realize the communications by receiving/transmitting the input/output packets by selectively controlling one of the packet encryption and authentication unit and an external packet processing device to carry out the encryption and authentication processing on the input/output packets, the external packet processing device being provided in a visited network at which the mobile computer is located and having a function for relaying packets transferred between a computer located in the visited network and a computer located in another network by applying the encryption and authentication processing.

22. The article of manufacture of claim 21, wherein the external packet processing device applies the encryption and authentication processing according to a first security policy defined for the external packet processing device; and the second computer readable program code means selects one of the packet encryption and authentication unit and the external packet processing device by comparing the first security policy with a second security policy suitable for the mobile computer.

23. The article of manufacture of claim 22, wherein the first security policy is indicated by a first security parameter set defined for the external packet processing device, while the second security policy is indicated by a second security parameter set defined for a packet processing device in a home network of the mobile computer.

24. The article of manufacture of claim 22, wherein the second computer readable program code means selects the external packet processing device when the first security policy matches with the second security policy, or the packet encryption and authentication unit otherwise.

25. The article of manufacture of claim 21, further comprising:

third computer readable program code means for causing said computer to judge whether or not the mobile computer is located outside a home network of the mobile computer; and fourth computer readable program code means for causing said computer to judge whether or not the external packet processing device exists in a currently visited network at which the mobile computer is currently located;

wherein the second computer readable program code means carries out the selectively controlling when the third computer readable program code means judges that the mobile computer is located outside the home network and the fourth computer readable program code means judges that the external packet processing device exists in the currently visited network.

26. The article of manufacture of claim 21, wherein the second computer readable program code means selects one of the packet encryption and authentication unit and the external packet processing device according to a user command entered into the mobile computer from an external.

27. The article of manufacture of claim 21, wherein the second computer readable program code means selects one of the packet encryption and authentication unit and the external packet processing device according to a remote command transmitted from an external management module provided in the inter-connected networks and received at the mobile computer.

28. The article of manufacture of claim 21, further comprising:

third computer readable program code means for causing said computer to monitor a packet transfer rate of the mobile computer;

wherein the second computer readable program code means selects one of the packet encryption and authentication unit and the external packet processing device according to the packet transfer rate monitored by the third computer readable program code means.

29. The article of manufacture of claim 28, wherein the second computer readable program code means selects the external packet processing device when the packet transfer rate monitored by the third computer readable program code means is lower than a reference value.

30. The article of manufacture of claim 28, wherein the second computer readable program code means selects the external packet processing device when the packet transfer rate monitored by the third computer readable program code means becomes lower than a first reference value, and the second computer readable program code means selects the packet encryption and authentication unit when the packet transfer rate monitored by the third computer readable program code means becomes higher than a second reference value, where the second reference value is greater than the first reference value.

* * * * *